No. 893,498. PATENTED JULY 14, 1908.
J. C. HIGDON.
MOTOR ATTACHMENT FOR VEHICLES.
APPLICATION FILED NOV. 21, 1905.
2 SHEETS—SHEET 1.
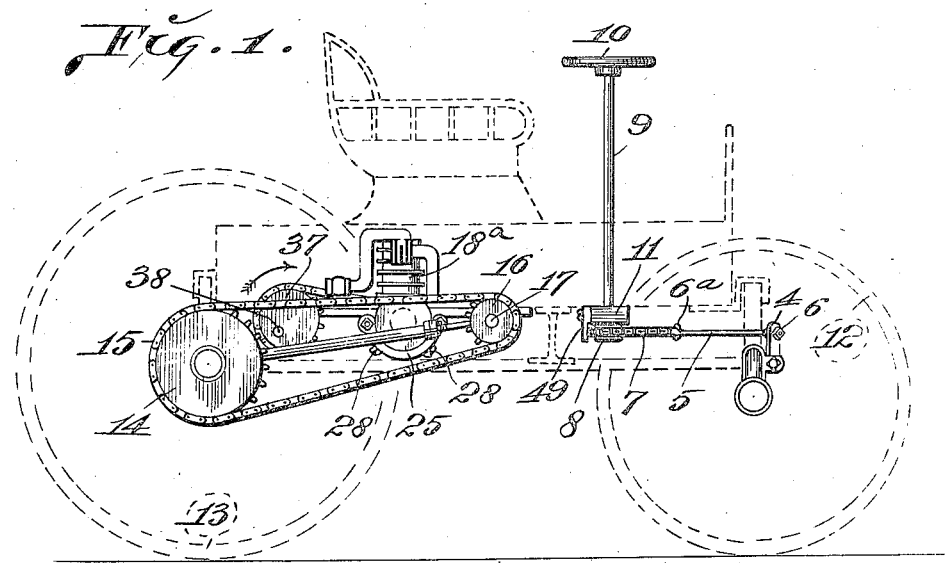
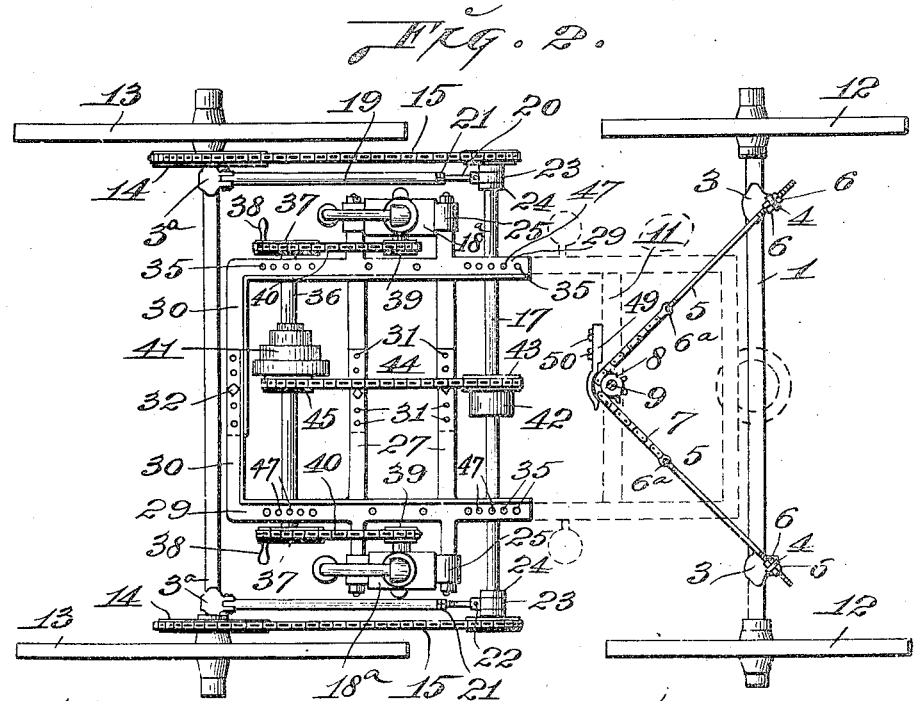
Inventor,
John Clark Higdon No. 893,498. PATENTED JULY 14, 1908.
J. C. HIGDON.
MOTOR ATTACHMENT FOR VEHICLES.
APPLICATION FILED NOV. 21, 1905.
2 SHEETS—SHEET 2.
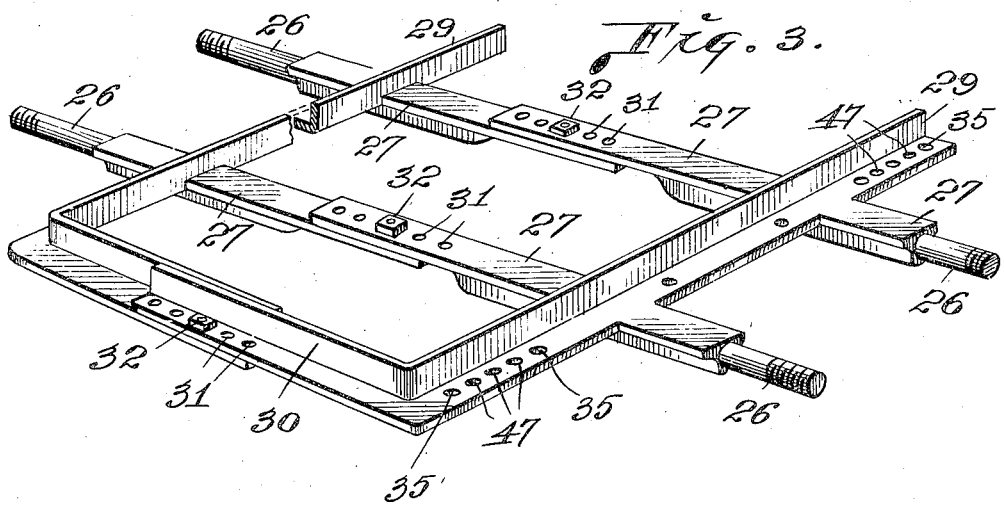
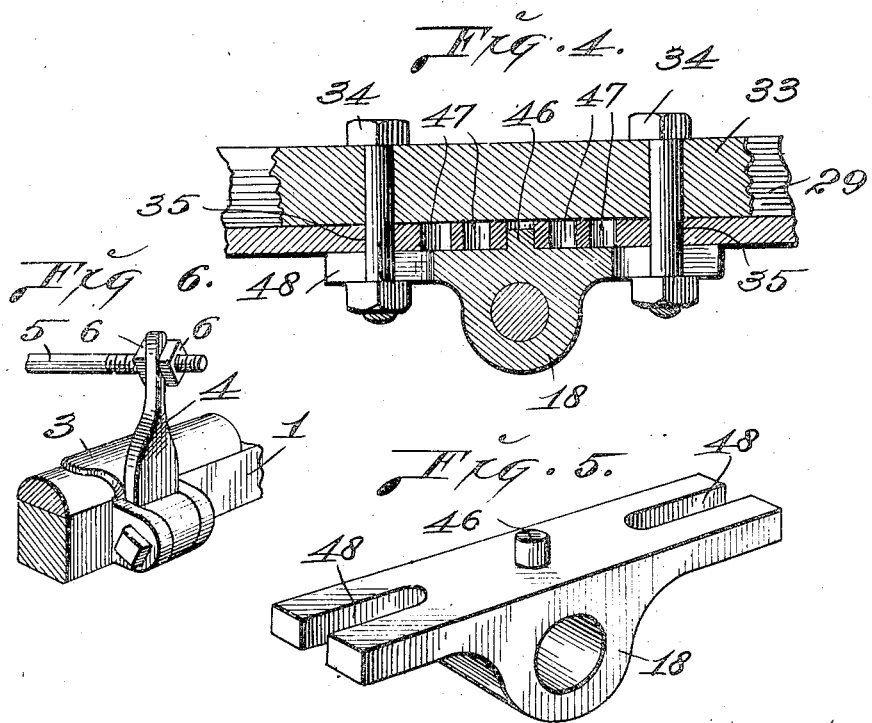
Attest,
M. T. Smith
H. J. Fletcher
Inventor,
John Clark Higdon

UNITED STATES PATENT OFFICE.

JOHN CLARK HIGDON, OF ST. LOUIS, MISSOURI.

MOTOR ATTACHMENT FOR VEHICLES.

No. 893,498.  Specification of Letters Patent.  Patented July 14, 1908.

Application filed November 21, 1905. Serial No. 288,496.

To all whom it may concern:

Be it known that I, JOHN CLARK HIGDON, a citizen of the United States, and resident of St. Louis, Missouri, have invented certain new and useful Improvements in Motor Attachments for Buggies and other Vehicles, of which the following is a specification containing a full, clear, and exact description, reference being had to the accompanying drawings, forming a part hereof.

My invention relates to automobiles, and consists in the novel construction and arrangement of parts hereinafter specified, and pointed out in the claims.

The object of my invention is to provide a simple and inexpensive motor mechanism which may be quickly applied to ordinary buggies and other vehicles without substantially changing any part of the vehicle to which the attachment is to be connected, and whereby ordinary vehicles may be converted into automobiles.

In the drawings:—Figure 1 is a side elevation of an ordinary buggy having my motor attachment applied thereto; Fig. 2 is a plan view of same with the body of the buggy removed; Fig. 3 is a perspective view of an adjustable motor frame made use of in carrying out my invention; Fig. 4 is a detail sectional view of a portion of the motor frame and one of the journal bearings swiveled and loosely connected thereto; Fig. 5 is a detail perspective view of one of the swiveling journal bearings; Fig. 6 is a detail view of the thill coupling steering attachment.

Referring by numerals to the drawings:— 1 and 2 respectively indicate the usual nonrevoluble front and rear axles having the reach and springs supporting the usual body, although it will of course be understood that I do not confine myself to this form of running gear reach or body, and my attachment may as well be applied to any other form of vehicle now being propelled by animal power.

It will be observed that I have not changed any portion of the running gear or body, with the sole exception that I have omitted the usual shafts or tongue, and have fitted to the front axle one of the usual thill shackles 3, and short vertical steering stubs 4, which have a hole near their upper ends. Extending through the holes in the upper ends of the stubs are steering rods 5 having their outer ends threaded, and provided with adjusting nuts 6 whereby said rods may be tightened or loosened. The inner ends of said rods 5 are preferably provided with an eye 6$^a$, or other suitable means for connecting the same to the common sprocket chain 7, which latter connects the inner ends of said steering rods, and passes over a sprocket wheel or pinion 8, which is fixed on the lower end of a steering post 9. An ordinary steering wheel 10 is fixed upon the upper end of said steering post 9. Said steering post 9 is mounted in a suitable bearing centrally of a cross bar 11, extending across the bottom of the body at a point some distance in the rear of the vertical plane in which the front axle 1 is located, so that the said steering rods 5 and their chain 7, together with the front axle 1, form a figure approximating a triangle, so that whenever said steering wheel is turned by the operator, said front axle 1 will be correspondingly moved, and the direction of the vehicle will be altered as the operator desires. The front wheels 12 and rear wheels 13 are of the usual form, and of comparatively large diameter, and are loosely mounted to rotate on the axles.

14 indicates a large sprocket wheel which is fixed upon the inner ends of the hubs of the rear wheels 13 so as to be driven by means of a common sprocket chain 15 extending from said wheel 14 to an additional sprocket wheel 16 fixed on the projecting end of the transverse shaft 17, which extends transversely beneath the body of the vehicle, and is mounted in suitable bearings 18.

At this point, I desire to state that I may use what is known as a "one-wheel drive," and make use of only one chain 15; but in other cases, I may use what is known as a "two-wheel drive," which I have illustrated, as shown in the drawings; and, in the latter case, I make use of two main drive chains, 15, located one on either side of the body.

It will be observed that the ends of the shaft 17 project a considerable distance beyond the side of the body, and I may state that such arrangement is provided for two purposes:—the first of which is to provide a large vacant space between the chains 15, for the air cooled hydro-carbon motors 18$^a$, and the second purpose is to get the sprocket wheels 16 such a distance from the body as that they will be in alinement with the sprocket wheels 14 carried by the rear wheels 13. A combined reach bar and chain tightener 19 adjustably connects the outer portions of the shaft 17 with the rear axle 2, and the specific construction of said reach bar is described as follows: Fixed on the rear axle 2, adjacent the sprocket wheels 14 are additional common thill shackles 3ª, and pivotally mounted in said thill shackles are the rear ends of said reach bars and chain tighteners 19. The main body of said part 19 is preferably made tubular, and an additional threaded part 20 is mounted telescopically in said tubular part; and adjustably connected therewith by means of lock nuts 21. The forward ends of part 20 are pivotally connected at 22 to a bearing 23, which is mounted upon said shaft 17 at a point between a collar 24 and the hub of said sprocket wheel 16.

I make use of one or more hydro carbon motors, 18ª, on account of their light weight, and in case but a single motor is used, I preferably locate it on the right-hand side of the body, in the space between the chain 15 and the buggy body for two reasons. The main reason for so locating the motor is that there may be no obstructions of any sort either in front or rear of it, thereby greatly augmenting the process of air cooling, as I have found by two months' constant use it will not overheat when so located.

It will be observed that there is a clear path for the air to pass both in front and rear of the motor, and there is also an air space between the motor and the buggy body. The motors in the present instance are of the usual inclosed fly wheel type, but it is clear that I may make use of any common form of motor with the fly wheel on the outside of the crank case. The motors are provided with the usual appliances, such as carbureters, mufflers, and sparking devices, but which I do not show on account of their well known construction. The motors are supported in a curved saddle 25, which is provided at its ends with perforated ears, through which pass stubs or bolts 26 at the outer ends of the motor, supporting the cross-bars 27. The motors may be secured to the supporting saddles by means of bolts or screws, 28, which pass through said saddles and engage the crank case, or any other common substitute may be used for this purpose.

I mount upon a special portable rectangular metal frame the entire motor mechanism except those parts which are carried by the rear wheels. This frame is more clearly shown in Fig. 3, although of course I do not limit myself to the exact details therein exhibited. As, for instance, I have shown the frame transversely adjustable to fit different widths of buggy bodies. The frame is preferably composed of two angle iron side bars, 29, and a rear cross bar 30. However, the adjustable feature may be dispensed with, and the entire frame may be made in the form of an integral malleable casting, drop forging or stamping. The motor cross bars 27 and the rear cross bar 30 are provided with perforated overlapping inner ends, through the perforations 31 of which suitable bolts, 32, or common rivets may be passed, in order to clamp the parts securely together. The metallic motor frame is secured beneath the usual sills, 33, of the buggy body by means of bolts, 34, passing through the holes, 35, formed in the angular side bars of said frame.

36 indicates a transverse counter shaft, which is mounted in bearings 18, and extends across the frame beneath the buggy body, with its ends projecting a slight distance beyond the side edges of said frame. Mounted upon the projecting end or ends of said counter shaft 36 is a toothed wheel, 37, which is preferably provided with a hand crank. Said wheel 37 is geared to a pinion, 39, on the motor. Said wheel 37 and pinion 39 may be directly connected in some cases by intermeshing their teeth, although in the present case I have shown them connected by common sprocket chain, 40, so that one or both of the motors may be used to drive said counter shaft. Mounted on said counter shaft is a common planetary change speed gear, 41, the construction or function of which is so thoroughly understood that same may not be shown or described, except to say that the change speed gear is used for the usual purpose.

Mounted on the front transverse shaft, 17, is a common differential gear, 42, which is only used when the "two wheel" drive is desired, in order that one of the rear wheels, 13, may turn faster than the other in rounding a street corner. But it is clear that when but "single drive" is used, the differential gear 42 need not be used, and in such case a common sprocket wheel, 43, may be fixed upon the shaft 17, and the chain 44 will connect said wheel 43 to another sprocket wheel 45, carried by said planetary gear 41. Of course, if no planetary gear is desired, the same may be omitted, and the sprocket wheel 45 may be fixed directly upon the counter shaft 36. All of the bearings of the counter shaft 36 and the front transverse shaft 17 are preferably of the form shown in Figs. 4 and 5, wherein the shafts pass through a plain bearing 18, although it is evident that I may make use of common ball or roller bearings if so desired.

Referring again to Figs. 4 and 5, it will be observed that each of the bearings 18 is provided upon its upper side with a pivot, 46, which may engage either one of a series of apertures or recesses, 47, formed in the side bars 29, and the motor frame thereby performs a two-fold function. The first function is to permit said bearings to swivel, in order that there may be no undue stress placed upon them during operation. In other words, the swiveling of the bearings 18 permits them to move slightly on their pivots 46, should either of the shafts 17 or 36 be slightly sprung, and such swiveling movement will permit the bearings to run with much less friction, as I have found during practical operation. The ends of the bearings are preferably provided with slots, 48, through which the bolts 34 are passed loosely, as it will never be necessary to forcibly tighten the nuts on said bolts, the function of said bolts being mainly to support the weight of said bearings, and not to rigidly bind them to the frame. When it is desired to tighten the chain 40—44, it will only be necessary to loosen the nuts of the bolts 34 and locate the bearing pivots 46 in other holes, 47.

49 indicates a combined retainer and friction brake for the steering chain 7. This part 49 is preferably in the form of a heavy steel spring, one end of which is secured to the cross bar 11 by means of bolts, 50, and the free end of said part 49 is made to forcibly engage said chain 7, in order to hold the same firmly in position upon the steering pinion 8, and also for the purpose of retarding the movement thereof, as it is clear that by forcing said part 49 into contact with the chain, the movement of same will thereby be impeded an amount corresponding to the pressure imposed upon said chain by said part 49. In operation, part 49 has proven highly efficacious, preventing sudden fluctuations of the steering wheel 10 when the front wheels, 12, strike a large obstruction.

The operation is as follows: When it is desired to start the motor or motors, the operator will first of course give proper attention to the usual carbureters and sparking apparatus, and will then grasp the crank handle 38 and give the motor an initial movement for the purpose of drawing in a charge of gas and thereby starting the same, after which the operator will of course withdraw his hand from the crank handle 38, which will continuously revolve with the counter shaft 36 in the direction indicated by the arrow in Fig. 1. Motion will be imparted from the sprocket wheel 45 to the sprocket wheel 43 on the transverse shaft 17, and from thence through the sprocket wheels 16 to the sprocket wheels 14, and the rear wheels 13. In tightening or loosening the main drive chain 15, it will only be necessary to manipulate the lock nuts 21 of the chain tightener 19—20. The speed of the vehicle will of course be controlled by increasing or diminishing the speed of the motors in the usual way, and also by manipulating the planetary gear 41 in the usual manner. When it is desired to stop the vehicle, the brake bands of the planetary gear will of course be released and the motor speed be diminished. In manipulating the steering wheel 10, the operator will of course understand that by turning the said wheel in one direction the front axle 1 will be swiveled in a corresponding direction, and vice versa.

I do not herein claim the steering gear, as I have made the same the subject matter of a divisional application.

What I claim is:

1. The combination with a vehicle body and running gear, of a frame applied to the under side of the vehicle body, a support projecting laterally from one side of the frame, and an air-cooled hydrocarbon motor held by the support in such a position that there is a free air space between the side of the vehicle body and said motor.

2. The combination with a vehicle body and running gear, of an adjustable frame detachably positioned on the under side of the vehicle body, a support projecting laterally from one side of the frame, and an air-cooled hydrocarbon motor held by the support in such a position that there is a free air space between the side of the vehicle body and said motor.

3. The combination with a vehicle body and running gear, of a frame applied to the under side of the vehicle body, a support projecting laterally from one side of the frame, an air-cooled hydrocarbon motor held by the support in such a position that there is a free air space between the side of the vehicle body and said motor, and driving connections between the motor and the running gear of the vehicle.

4. A driving mechanism for vehicles, comprising an adjustable frame detachably applied to the vehicle body, a support projecting laterally from one side of the frame, an air cooled hydrocarbon motor carried by the support, and a driving connection from said motor to one of the wheels of the vehicle.

5. The combination with a vehicle body and its running gear, of a transversely adjustable frame detachably applied to the under side of the vehicle body, a support projecting from one side of said frame, a saddle arranged on the end of the support, an air cooled hydrocarbon motor seated in the saddle, and a driving connection from the motor to one of the wheels of the vehicle.

6. The combination with a vehicle body and its running gear, of a transversely adjustable frame detachably applied to the under side of the vehicle body, a support projecting from one side of the frame, an air cooled hydrocarbon motor carried by the outer end of the support, there being an air space between said motor and the side of the vehicle body, journal boxes adjustably arranged on the frame, a driving shaft and a counter shaft mounted in said journal boxes, a driving connection from said motor to the counter shaft, a driving connection from the counter shaft to the driving shaft, and a driving connection from the driving shaft to one of the vehicle wheels.

7. The combination with a vehicle body and its running gear, of a frame applied to the under side of the vehicle body, a pair of supports projecting laterally from each side of the frame, an independently operating air cooled hydrocarbon motor detachably carried by each pair of supports in such a manner as that there is a free air space between each motor and the adjacent side of the vehicle body, and driving connections from the motors to the rear wheels of the vehicle running gear.

8. The combination with a vehicle body and its running gear, of a suitable motor supported by said body, a light semiflexible transverse driving shaft operatively connected to said motor and mounted so that its end projects across a considerable space at the side of said body, a sprocket wheel fixed on the vehicle wheel, another sprocket wheel fixed on the projecting end of said shaft, a chain connecting said two sprocket wheels, a shackle on the axle, a bearing at the outer end of said shaft, and a reach bar having its rear end pivotally connected to said shackle and its front end connected to the bearing at the outer end of said shaft.

9. The combination with a vehicle body and its running gear, of a frame detachably applied to the under side of the body, a motor supported by the frame, a transverse shaft carried by the frame and operated by the motor, both ends of which driving shaft extend outwardly beyond the sides of the frame and body, sprocket wheels fixed on the vehicle wheels, sprocket wheels on the ends of the driving shaft, sprocket chains connecting the two sprocket wheels on said shaft with those on the vehicle wheels, shackles on the axle, bearings on the driving shaft, and adjustable reach-bars having their ends pivotally connected to the shackle and to the bearing.

In testimony whereof, I have signed my name to this specification, in presence of two subscribing witnesses.

JOHN CLARK HIGDON.

Witnesses:
M. P. SMITH,
E. M. HARRINGTON.